(12) United States Patent
Shields

(10) Patent No.: US 10,460,159 B1
(45) Date of Patent: Oct. 29, 2019

(54) VIDEO ENDPOINT, COMMUNICATION SYSTEM, AND RELATED METHOD FOR AUTOMATIC FRAMING A SIGNING AREA OF A SIGN LANGUAGE USER

(71) Applicant: SORENSON IP HOLDINGS, LLC, Salt Lake City, UT (US)

(72) Inventor: Richard H. Shields, Pleasant Grove, UT (US)

(73) Assignee: SORENSON IP HOLDINGS, LLC, Salt Lake City, UT (US)

( * ) Notice: Subject to any disclaimer, the term of this patent is extended or adjusted under 35 U.S.C. 154(b) by 307 days.

(21) Appl. No.: 14/929,191

(22) Filed: Oct. 30, 2015

(51) Int. Cl.
| | |
|---|---|
| *G06T 7/20* | (2017.01) |
| *G06K 9/00* | (2006.01) |
| *H04N 5/232* | (2006.01) |
| *G09B 21/00* | (2006.01) |

(52) U.S. Cl.
CPC ............ *G06K 9/00389* (2013.01); *G06T 7/20* (2013.01); *G09B 21/009* (2013.01); *H04N 5/23219* (2013.01)

(58) Field of Classification Search
CPC .... G06K 9/00389; G06T 7/20; G09B 21/009; H04N 5/23219
See application file for complete search history.

(56) References Cited

U.S. PATENT DOCUMENTS

| | | | |
|---|---|---|---|
| 7,742,068 B2 | 6/2010 | Cupal et al. | |
| 8,248,448 B2 | 8/2012 | Feng et al. | |
| 8,395,653 B2 | 3/2013 | Feng et al. | |
| 8,842,161 B2 | 9/2014 | Feng et al. | |
| 8,976,220 B2 | 3/2015 | Maxwell | |
| 2006/0285652 A1* | 12/2006 | McClelland | H04M 3/42391 379/52 |
| 2011/0285807 A1* | 11/2011 | Feng | G06K 9/00228 348/14.08 |
| 2014/0049595 A1* | 2/2014 | Feng | H04N 7/15 348/14.08 |

OTHER PUBLICATIONS

U.S. Appl. No. 14/630,452, to Winsor et al., filed Feb. 24, 2015.
U.S. Appl. No. 14/741,296, to Winsor et al., filed Jun. 16, 2015.

* cited by examiner

*Primary Examiner* — Dave Czekaj
*Assistant Examiner* — Berteau Joisil
(74) *Attorney, Agent, or Firm* — TraskBritt

(57) ABSTRACT

Communication systems and methods are disclosed for enabling a first user at a video endpoint to communicate with a far-end user at a communication device via a relay service providing translation services for the first user. The video endpoint may include a camera and may be configured to frame a view of the camera to include a signing area of a user. The video endpoint may be configured to determine the signing area of the user by taking measurements of the user's body and framing a region around the user to include the signing area based on the measurements, by monitoring a range of motion for the signing area of the user, and other methods.

13 Claims, 4 Drawing Sheets

VIDEO ENDPOINT, COMMUNICATION SYSTEM, AND RELATED METHOD FOR AUTOMATIC FRAMING A SIGNING AREA OF A SIGN LANGUAGE USER

TECHNICAL FIELD

The disclosure relates to conveying information from data signals from a video endpoint to a far end communication device according to a plurality of different modes. More specifically, the disclosure relates to automatic framing a view of a camera of the video endpoint to include a signing area of a user.

BACKGROUND

Traditional communication systems, such as standard and cellular telephone systems, enable verbal communications between people at different locations. Communication systems for hard-of-hearing individuals may also enable non-verbal communications instead of, or in addition to, verbal communications. Some communication systems for hard-of-hearing people enable communications between communication devices for hard-of-hearing people and communication systems for hearing users (e.g., standard telephones, cellular telephones, etc.). For example, a video relay service (VRS) may provide speech to sign language translation services, and sign language to speech translation services for a communication session between a video phone for a first user and a traditional telephone for a hearing user. Conventionally, the audibly-impaired user communicates with a call assistant (e.g., communicating via sign language), and then the call assistant conveys the messages to the far-end user.

BRIEF SUMMARY

In some embodiments, the disclosure includes a communication system, having a video endpoint having a camera. The video endpoint is configured to automatically frame a field of view of the camera to include a determined signing area of an audibly-impaired user. The relay service is configured to provide sign language translation services during a communication session with the audibly-impaired user at the video endpoint and a far-end user at a communication device.

In some embodiments, the disclosure includes a video endpoint including a camera configured to capture video data for a field of view; and a processor operably coupled to the camera, wherein the processor is configured to determine a signing area for a user within the field of view and adjust the camera to frame the field of view to include a determined signing area of a user.

In some embodiments, the disclosure includes methods of operating a communication system. Some methods may include initiating framing of a field of view of a camera for a video endpoint to include a signing area of a user, capturing a sample of video data with the camera, analyzing the sample of video data captured by the camera for characteristics of the user, determining the signing area of the user using the characteristics of the user, defining a frame of the field of view of the camera that includes the signing area of the user, and framing the field of view of the camera to include the signing area of the user.

DETAILED DESCRIPTION

Figure 1:
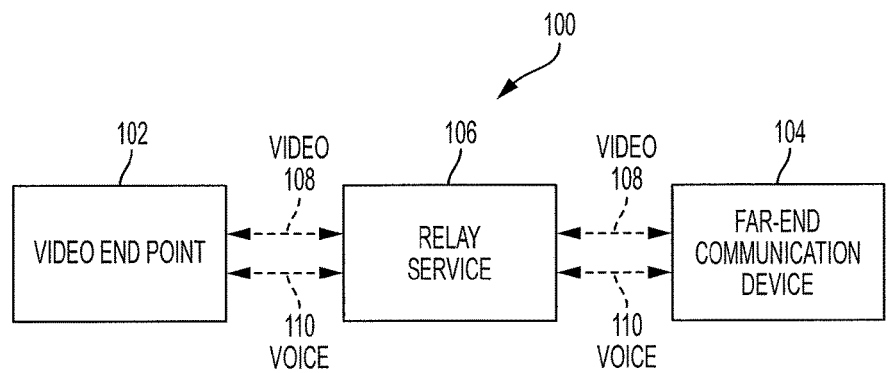
FIG. 1 is a simplified block diagram of a communication system according to an embodiment of the disclosure.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a video relay service for providing sign language interpretation services to assist audibly-impaired users. Embodiments include features that improve the functionality of the communication device such that new communication device and method for controlling a video communication device is provided. As a result, the interaction of the communication device with other systems may be improved in addition to an improved user experience.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "vertical" and "horizontal" may refer to a drawing figure as oriented on the drawing sheet, and are in no way limiting of orientation of an apparatus, or any portion thereof, unless it is apparent that a particular orientation of the apparatus is necessary or desirable for operation in view of gravitational forces. For example, when referring to elements illustrated in the figures, the terms "vertical" or "horizontal" may refer to a view of a camera that includes a head of a user oriented in a normal position.

Embodiments of the disclosure include apparatuses and methods for operating a communication system. It should be noted that while the utility and application of the various embodiments of the disclosure are described herein with reference to a relay service for individuals having disabilities, the embodiments of the disclosure also include any environment for a communication system to selectively operate in one of a plurality of different modes, such as where a text mode and a tone mode may be desirable.

FIG. 1 is a simplified block diagram of a communication system 100 according to an embodiment of the disclosure. The communication system 100 may include a video relay service (VRS) or other communication system configured to facilitate communication between audibly-impaired users and far-end users (e.g., audibly-capable users, computerized systems, etc.).

The communication system 100 may include a video endpoint 102 and a far-end communication device 104 that are configured to participate in communication sessions via the relay service 106 through one or more networks. In some embodiments, the video endpoint 102 may comprise a communication device specifically configured for use by an individual having an audible impairment. For example, the person may have a hearing impairment, speech impairment, and/or vision impairment. Communication devices that may be used to assist users having such an impairment may include a video phone device, a text-captioned device, keyboards, remote control, other devices or accessibility interfaces, and combinations thereof. The video endpoint 102 may include a computing device configured to execute software directed to perform such communication capabilities. Examples of suitable computing devices may include a desktop computer, a laptop computer, a tablet computer, a personal digital assistant (PDA), a smartphone, a set top box coupled with a monitor (e.g., television) and camera (e.g., webcam), and other computing devices.

In a typical relay system environment for such users, the video endpoint 102 may be operated by a user having an audible impairment, and the far-end communication device 104 may be operated by a audibly-capable user. For convenience, the video endpoint 102 may also be referred to as the "near-end" device, while the far-end communication device 104 may also be referred to herein as the "far-end" device. The user of the video endpoint 102 may be referred to as the "near-end user," and the user of the far-end communication device 104 may be referred to as the "far-end user." Of course, it is recognized that "near-end" and "far-end" are relative terms depending on the perspective of the particular user. Thus, the terms "near-end" and "far-end" are used as a convenient way of distinguishing between users.

The near-end user may have a disability that may make it difficult to communicate with the far-end user. The near-end user may, therefore, be referred to as an audibly-impaired user. For example, the near-end user may be an hearing-impaired (e.g., deaf) user, a speech-impaired (e.g., mute) user, or have some other impairment or combinations thereof. The far-end user may be an audibly-capable user, a computer system (e.g., an automated system), an individual having an impairment, or a combination thereof.

The relay service 106 is configured to interpret communication between the video endpoint 102 and the far-end communication device 104 to facilitate assisted communication sessions therebetween. The operator at the relay service 106 performing the interpretation may be referred to as a "call assistant" or "interpreter." Communication between the video endpoint 102 and the relay service 106 may be typically performed through video communication between the near-end user and the call assistant, while communication between the relay service 106 and the far-end communication device 104 may be typically performed using voice communication between the call assistant and the far-end user. Thus, the video data 108 (and optionally voice data 110) may be communicated between the video endpoint 102 and the relay service 106. Voice data 110 (and optionally video data 108) may be communicated between the relay service 106 and the far-end communication device 104. The video data 108 may include video information conveying video images of the near-end user and the call assistant. For example, the video data 108 sent from the video endpoint 102 to the relay service 106 may include video images of the near-end user that is displayed by an electronic display at the relay service 106 to the call assistant. The video data 108 sent from the relay service 106 to the video endpoint 102 may include video images of the call assistant that is displayed by an electronic display at the video endpoint 102 to the near-end user. As a result, the near-end user and the call assistant may communicate with each other using visual cues (e.g., sign language, facial expressions, lip reading, and/or other body language) between the near-end user and the call assistant.

If the near-end user has at least some speech capabilities (e.g., users that are audibly-impaired but have some ability to speak), voice data 110 may be transmitted from the video endpoint 102 to the relay service 106. If the near-end user has at least some audible-capabilities (e.g., users that are not completely deaf), voice data 110 may be transmitted in addition to the video data 108 from the relay service 106 to the video endpoint 102. In some embodiments, however, audio from the video endpoint 102 may be disabled such that the relay service 106 and/or the far-end communication device 104 may not be able to hear any speech or other audible noise from the video endpoint 102.

The relay service 106 and the far-end communication device 104 may be configured to communicate voice data 110 with each other to facilitate hearing communication between the call assistant and the far-end user (e.g., a live person, a computer system, etc.). The voice data 110 may include audible information shared between the relay service 106 and the far-end communication device 104. For example, the voice data 110 may include audible speech of the call assistant and the far-end user. As a result, the communication system 100 may facilitate translated communication for near-end users with others regardless of whether the far-end user is able to communicate using the mode of communication for the near-end user. In some embodiments, the voice data 110 transmitted to the far-end communication device 104 may also include audible speech of the near-end user if the video endpoint 102 is configured to transmit audio, and such audio is desired to be heard by the far-end user. Voice data 110 generated by the far-end user is not limited to live voice from a live person. For example, the far-end user may include an automated telephone menu system that transmits voice data 110 that includes synthesized voice, recorded voice, or other audible information intended to convey information (e.g., interactive voice response (IVR)).

In some embodiments, the far-end communication device 104 may be configured to also send and receive video communications. For example, both the video endpoint 102 and the far-end communication device 104 may be video phones of the VRS communication system 100. In such embodiments, the far-end communication device 104 may be configured to receive the video data 108 including the video images of the near-end user, the call assistant, or a combination thereof. The far-end communication device 104 may be configured to receive the video data 108 from the video endpoint 102, the relay service 106, or combinations thereof. Receipt of the video data 108 by the far-end communication device 104 may enable the far-end user to observe non-verbal communication from the near-end user. Thus, the communication system 100 may also be configured to facilitate communication between audibly-impaired users as well.

The video endpoint 102, the far-end communication device 104, and the relay service 106 may be configured to transmit the data signals 108, 110 over one or more networks. It should be recognized that even though the data signals 108, 110 are illustrated in the figures as individual lines, that does not mean that the data signals 108, 110 are transmitted separately. For example, some of the data signals 108, 110 may be transmitted together over the same bus.

The networks used for conveying the data signals 108, 110 may include an internet protocol (IP) network. The networks may also include other networks, such as, for example, public switched telephone networks (PSTNs). The networks may include a wide area network (WAN), a local area network (LAN), a personal area network (PAN), and combinations thereof. In some embodiments, the networks may include a cloud network. The networks may be configured to facilitate wireless communications, communications through cables, and combinations thereof. Some non-limiting examples of suitable wireless communications may include "Wi-Fi," Bluetooth, and mobile wireless networks. Some non-limiting examples of suitable cables include fiber-optic cables, coaxial cables, traditional telephone cables, and Ethernet cables.

Figure 2:
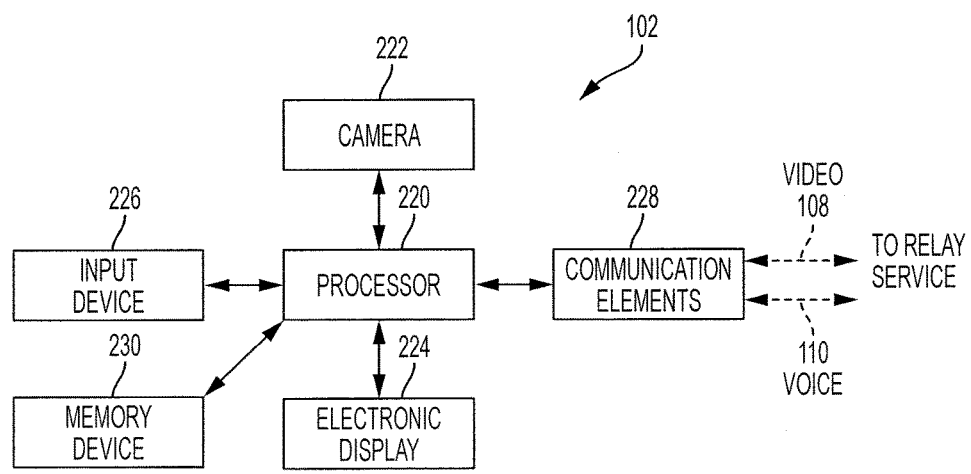
FIG. 2 is a simplified block diagram of the video endpoint of FIG. 1.

FIG. 2 is a simplified block diagram of the video endpoint 102 of FIG. 1. The video endpoint 102 may include a processor 220 operably coupled with a camera 222, an electronic display 224, input devices 226, one or more communication elements 228, and a memory device 230. The video endpoint 102 may be configured to communicate video data 108 from the camera 222 to the relay service 106 (FIG. 1) through the communication elements 228. The video data 108 captured by the camera 222 may include sign language communication originated by the near-end user. The video endpoint 102 may also be configured to receive video data 108 from the relay service 106 through the communication elements 228 to be displayed by the electronic display 224. The video data 108 received by the video endpoint 102 may include sign language communication originated by the call assistant at the relay service 106.

The processor 220 may coordinate the communication between the various devices as well as execute instructions stored in computer-readable media of the memory device 230. The memory device 230 may include volatile and non-volatile memory storage for the video endpoint 102. The processor 220 may include one or more processors. For example, the processor 220 may include a video processor and an audio processor.

Input devices 226 may include devices such as keyboard, touch screen interface, remote control, microphone, infrared camera, motion sensors, or other devices that are configured to receive information that may be used by the processor to receive inputs that are used by the processor 220 to determine the signing area and/or operate different functions the video endpoint 102.

In some embodiments, the camera 222 may be integrated into the video endpoint 102. The camera 222 may be a camera 222 integrated into a video phone. For example, the camera 222 may be similar to the cameras described in U.S. Pat. No. 8,976,220, to Maxwell, issued Mar. 10, 2015, the disclosure of which is incorporated herein in its entirety by this reference. In other embodiments, the camera 222 may be separate from the video endpoint 102 but may be operably coupled to the video endpoint 102. For example, the camera 222 may be mounted to a display (e.g., a television) such that the display may serve as electronic display 224 of the video endpoint 102. The camera 222 may be similar to the camera described in U.S. patent application Ser. No.

14/630,452, to Winsor et al., filed Feb. 24, 2015, or the Remote Camera Unit described in U.S. patent application Ser. No. 14/741,296, to Winsor et al., filed Jun. 16, 2015, the disclosures of which are incorporated herein in their entireties by this reference. In other embodiments, the camera 222 may include an image capturing device of one or more of a computer, laptop, phone, tablet, mobile device, PDA, etc. Furthermore, the camera 222 could be any image capturing device that can be used in conjunction with video communication.

Figure 3A:
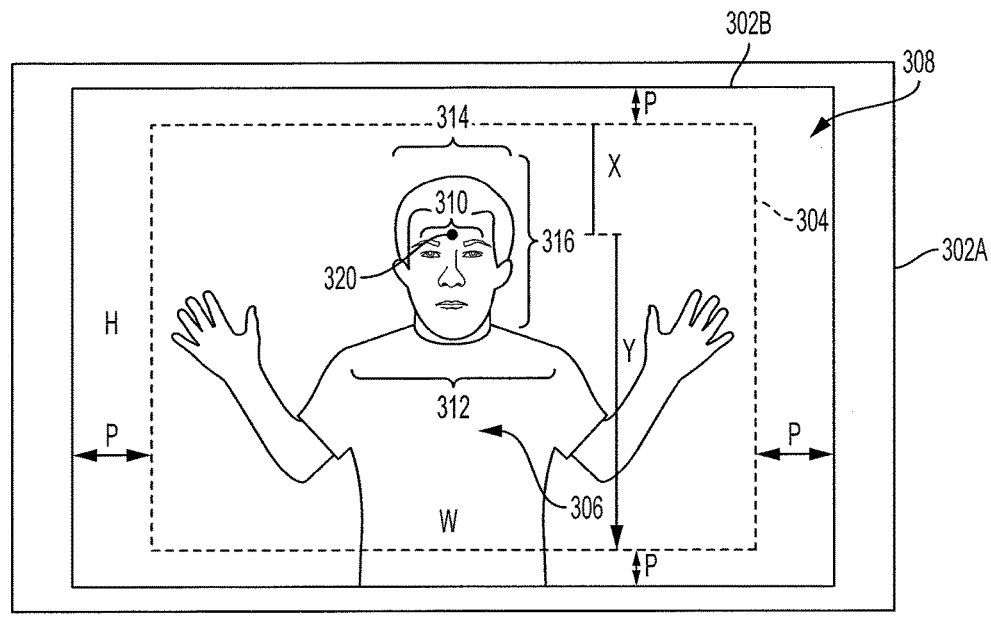
FIGS. 3A through 3C are schematic representation of different views of a camera of the video endpoint of FIG. 2.
Figure 3B:
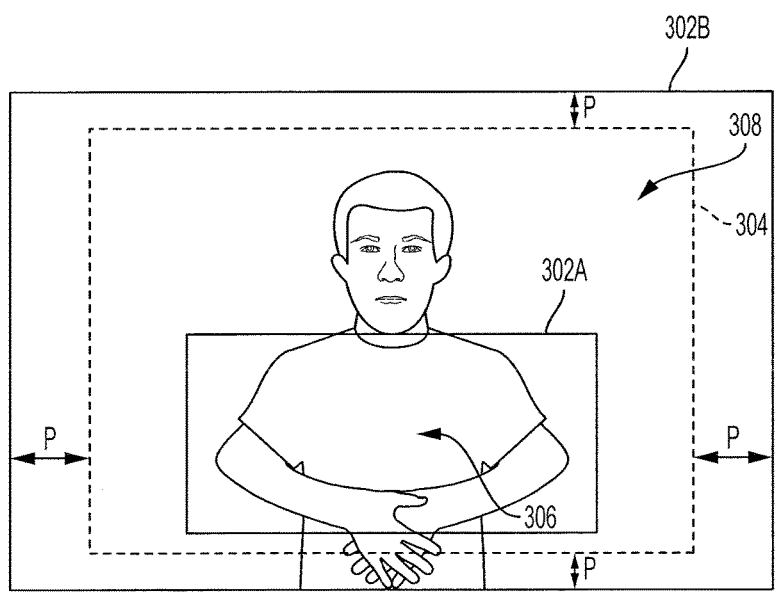

FIGS. 3A and 3B are schematic representations of screenshots of a field of view 302 of the video data 108 that may be captured by the camera 222 (FIG. 2) of the video endpoint 102 (FIG. 2). This video data 108 may be communicated to the relay service 106 to facilitate sign language communication between the audibly-impaired user and the call assistant. As a result, the field of view 302 of the camera 222 may include the video data 108 that is visible (e.g., video images) to the call assistant when the video data 108 is reproduced by the electronic display of the relay service 106. In order to facilitate explanation of the embodiments described herein, the field of view 302 of the video data 108 captured by the camera 222 of the video endpoint 102 will be referred to hereinafter as "field of view 302 of the camera 222." It should be recognized, however, that the call assistant of the relay service 106 may also have a video endpoint with a camera capturing video data of the call assistant that is sent to the video endpoint 102. As a result, even though the following description is described with reference to the captured video of the audibly-impaired user, it is contemplated that this description applies as well to the captured video and operation of the video endpoint associated with the call assistant. In other words, the field of view 302 may also be representative of the video data 108 that is captured by the camera at the relay service 106 that is visible to the near-end user on the video endpoint 102 during the communication session with the call assistant.

Referring to FIGS. 2 and 3A together, the video endpoint 102 may be configured to perform an automatic framing function for the camera 222 with regard to its field of view during the communication session. For example, the video endpoint 102 may be configured to automatically frame the field of view of the camera 222 around a determined signing area for the audibly-impaired user 306. For purposes of the disclosure, the term "framing" refers to changing the field of view for the video data 108 captured by the camera 222. For example, framing may include optically zooming in or out and/or changing an orientation of the camera 222 by tilting or panning the camera 222. Thus, the camera may include its own processor and/or motor that is controllable by the processor 220 of the video endpoint 102 to accomplish one or more of the framing functions. In addition, framing may also include modifying the video data 108 that has already been captured by the camera 222 prior to transmitting the video data 108 to the relay service 106. For example, the processor 220 may be configured to digitally zoom in on a region of the video images of the video data 108 and/or crop the video images of the video data 108 prior to transmitting the video data 108 to the relay service 106.

As shown in FIG. 3A, the camera 222 may have an initial field of view 302A. The processor 220 may determine the signing area 304 as a defined area that provides that certain portions (e.g., body parts) of the audibly-impaired user 306 and regions around the audibly-impaired user 306 where the audibly-impaired user 306 may typically perform sign language are located within the frame. In other words, the signing area 304 may include at least the hands of the audibly-impaired user 306 and an area around the user's body where the audibly-impaired user 306 may use his or her hands while signing. In some embodiments, the determined signing area 304 of the audibly-impaired user 306 may be at least substantially within a region having height H that vertically extends from about a top of the head of the user to about the navel (i.e., belly button) of the audibly-impaired user 306. The width W of the signing area 304 may extend horizontally at least past a width of the shoulders of the audibly-impaired user 306 for a sufficient distance where signing may occur.

The video endpoint 102 may be configured to automatically frame the field of view of the camera 222 to ensure that the signing area 304 of the audibly-impaired user 306 is at least substantially included in the field of view of the camera 222. For example, the processor 220 may control the camera 222 to perform automatic framing by adjusting the field of view of the camera 222 to have a second field of view 302B. By automatic framing the camera 222 to include the determined signing area 304, the sign language gestures may at least substantially always be included within the field of view of the camera 222 with desired dimensions that result in the gestures being viewable by the call assistant of the relay service 106.

When determining the location and dimensions of the signing area 304, the processor 220 of the video endpoint 102 (e.g., via real-time image processing and/or motion tracking) may be configured to first locate a known body part of the audibly-impaired user 306, and then expand the height H and width W of the signing area 304 to have dimensions proportional to a measurement of the body part. For example, in some embodiments, the processor 220 may locate the head of audibly-impaired user 306, calculate the dimensions of the head (e.g., width 314 and/or height 316), and then proportionally adjust the dimensions for the height H and width W of the signing area 304 corresponding to the calculated dimensions of the head. In some embodiments, other body parts (e.g., eyes, nose, neck, stomach, shoulders, etc.) may be used for detection within the image and for determining the reference point and dimensions of the signing area 304. For example, the processor 220 may determine a spacing 310 between the eyes of the audibly-impaired user 306, from which the dimensions for the signing area 304 may be determined. In some embodiments, shoulder width 312 may be used as a starting point for proportionally defining the size dimensions of the signing area 304. Other body parts (e.g., neck length, hand size, arm length, etc.) may also be used, as well as any combinations of dimensions for the various body parts rather than relying on a single measurement. In some embodiments, depth information may also be captured by the video endpoint 102 such that the processor 220 may also determine the distance of the audibly-impaired user 306 from the camera 222. This depth information may be combined with the other measurements to determine the appropriate size of the signing area 304 relative to the body part measurements. References to measurements herein may be converted to real world units (e.g., inches, centimeters, etc.), as pixels of a frame, or some other unit.

After determining the dimensions for the appropriate signing area 304, the placement of the signing area 304 may be determined. The processor 220 may be configured to locate a reference point 320 for orienting the signing area 304. In some embodiments, the reference point 320 may at or near the same body part used to determine the dimensions of the signing area 304. For example, reference point 320 may be located between the eyes; however, other reference points are contemplated. The processor 220 may determine that the upper boundary for the signing area 304 should be X units above the reference point 320, and Y units below the reference point 320 (e.g., H=X+Y).

Once the appropriate size and location of the signing area 304 is determined, the video endpoint 102 may be configured to adjust one or more features (e.g., zoom, pan, tilt, etc.) of the camera 222 to frame the camera 222 to include the signing area 304 to have the desired dimensions within the adjusted field of view 302B. Framing the camera 222 may further include centering the determined signing area 304 within the adjusted field of view 302B. For example, adjusted field of view 302B may continue to be adjusted so that the reference point 320 may be maintain its desired location so that the audibly-impaired user 306 may remain in the center of the adjusted field of view 302B. In some embodiments, one or more dimensions of the determined signing area 304 and the automatically adjusted field of view 302B may be substantially the same. In some embodiments, one or more dimensions of the determined signing area 304 and the automatically adjusted field of view 302B may be different. For example, in some embodiments the dimensions of the field of view 302B may be greater than the determined signing area 304 in order to provide some padding area P around the determined signing area 304. In some embodiments, the padding area may be greater in one dimension (e.g., horizontally) compared with another dimension (e.g., vertically) as there may be more variation in the movement in the one dimension for which more padding P is provided. In other embodiments, padding area (if any) may simply be factored into the defined signing area 304 such that the dimensions of the adjusted field of view and the defined signing area 304 may be the same. In other words, there may be no additional padding added to the adjusted field of view 302 from the defined signing area 304 determined by the processor 220 such that the two dimensions may be the same.

In some embodiments where the aspect ratio for the field of view 302B is greater in one dimension, it is contemplated that the determined signing area 304 is defined in only one dimension (e.g., vertically based on its height H) as the aspect ratio of the camera 222 will likely have an appropriate length in the other dimension (e.g., horizontally based on its width W) due to the particular aspect ratio of the camera as long as the appropriate length in one of the dimensions is maintained.

Thus, the video endpoint 102 may perform the automatic framing as desired during the communication session. In some embodiments, the automatic framing may be initiated automatically at the beginning of a new communication session. In some embodiments, the video endpoint 102 may initiate the automatic framing responsive to the video endpoint 102 receiving a user input to initiate the automatic framing function. For example, the user may provide an input on the video endpoint 102, camera 222, and/or a remote control to initiate the automatic framing function. The user input may include one or more of pushing a button (e.g., mechanical, GUI, etc.), convey a voice command, and/or a gesture recognized by the video endpoint 102. In some embodiments, once automatic framing is enabled, the automatic framing may continuously refresh at intervals during the communication session such that the camera 222 may be adjusted to frame to a moving signing area 304 if the audibly-impaired user's signing area 304 changes relative to the adjusted field of view 302B (e.g., outside of the adjusted field of view 302B or in size relative its desired size).

Referring now to FIG. 3B, the audibly-impaired user 306 may be situated such that the initial field of view 302A is too small relative to the determined signing area 304 of the user. In such an embodiment, only a portion of the audibly-impaired user 306 may be viewable. In some embodiments, the processor 220 may attempt to identify known body parts and/or other reference points that are currently viewable to determine the appropriate signing area 304. In this case, the eyes are not viewable so different body parts may be used to determine the appropriate signing area 304. In some embodiments, the processor 220 may control the camera 222 to zoom out until a known body part is recognized, after which the appropriate signing area 304 may be determined and the processor 220 may adjust the camera 222 to perform the automatic framing.

In some embodiments, the user's signing area 304 may be defined by the user prior to a communication session. For example, the audibly-impaired user may position themselves within the field of view during a setup procedure into a desired position within the frame. In other words, the electronic display 224 may show the near-end video data so that the audibly-impaired user can position themselves in their desired location within the frame for their desired signing area. The audibly-impaired user 306 may provide an input (e.g., via a remote control, voice commands, etc.) when they are positioned in the desired location for their signing area 304 for the camera 222 to capture the frame as the desired field of view for the user's signing area during a communication session. In some embodiments, the processor 220 may superimpose a template over the displayed video data to assist the audibly-impaired user 306 in positioning themselves. For example, the template may include a silhouette outline of a person with appropriate dimensions on the sides of the silhouette for the user to position themselves within the setup frame. In some embodiments, the processor 220 may automatically save the data responsive to detecting that the audibly-impaired user is positioned at the appropriate location within the template without requiring the user to manually initiate saving the data.

In some embodiments, the signing space setup procedure may instruct the audibly-impaired user to an initial position and then provide additional instructions to determine the appropriate signing space and/or field of view to use during automatic framing. The instructions (e.g., text, images, video) may be displayed on the electronic display 224 for the video endpoint 102. For example, the instructions may instruct the audibly-impaired user to position their hands at a natural position for signing to obtain an appropriate width and/or height of the initial signing area. In some embodiments, the instructions may instruct the audibly-impaired to sign a particular word or set of words that will cause their hands to extend to the outer ranges (e.g., horizontally and/or vertically) of their individual signing area. By analyzing these signing gestures performed by the audibly-impaired user as instructed, the processor 220 may determine the dimensions for the initial signing area.

The video endpoint 102 may store the dimensions of the initial signing area 304 during a signing space setup procedure in the memory device 230 for subsequent use, such that the automatic framing process may utilize the previously stored dimensions for the determined signing area 304 and/or field of view during a communication session. In some embodiments, the processor 220 may determine measurements of body parts when positioned in the desired signing area during such a setup procedure. Such measurements may be stored in the memory device 230 to assist with subsequent auto-framing. During the communication session, the video endpoint 102 may locate a reference point (e.g., eyes, nose, head, etc.) from which the desired dimensions for the pre-defined signing area 304 and/or other measurements may then be applied for automatic framing to occur.

In some embodiments, multiple users may operate the same video endpoint. For example, the video endpoint may be in a home or office setting in which multiple audibly-impaired users may use the video endpoint 102 at different times. In addition, a video endpoint may be located at the relay service 106 for use by different call assistants that have different defined signing areas. The memory device 230 of the video endpoint 102 may store information (e.g., dimensions, body measurements) for each known user that may be used to determine their unique signing area. Thus, when different users use the same video endpoint, the video endpoint 102 may determine which set of information should be used for determining the signing area for automatic framing purposes. The video endpoint 102 may distinguish between users based on different login credentials at the beginning of using the video endpoint. In some embodiments, the video endpoint 102 may distinguish between users during actual use of the video endpoint. For example, facial recognition software may identify different users, retrieve the appropriate signing area information, and apply the determined signing area 304 accordingly during real-time use. In some situations, identifying a new user may cause the video endpoint 102 to logout the previous user and cause a new login (e.g., automatically) for the new user. In some embodiments, identifying a new user may simply apply the determined signing area 304 during a particular communication session without changing other login/logout settings.

Signing areas may vary among different audibly-impaired users depending on their preferences, signing style, and where signing is most comfortable for them. Furthermore, the signing area 304 of a person may vary (e.g., change) throughout a conversation. In some embodiments, the video endpoint 102 may train itself regarding the dimensions of the audibly-impaired user's signing area 304. For example, the processor 220 of the video endpoint 102 may analyze the video data 108 to determine the range of motion of a particular user's sign language during a communication session. The video endpoint 102 may determine the signing area 304 based on the outer limits of the signing area and/or based on an area where a desired percentage of signing activity occurs as a threshold amount. For example, the processor 220 may detect that the head may remain relatively stationary within the current field of view, but that the hands may be consistently falling outside of the field of view. As a result, the dimensions of the signing area 304 may dynamically change for a given audibly-impaired user over time (including in real-time) as more information regarding the particular user's signing area is obtained.

Having the video endpoint 102 perform an automatic framing of its camera to maintain the determined signing area 304 within the field of view 302 of the camera 222 may provide advantages for audibly-impaired users over known automatic framing techniques, which typically focus on keeping a face of a user within a field of view 302 of a camera 222. Automatic framing the field of view 302 of the camera 222 to maintain a signing area 304 within the field of view 302 of the camera 222 may make communication sessions using the video endpoint 102 more efficient. For example, automatic framing the signing area 304 may reduce time wasted on manually adjusting the field of view 302 of the camera 222 prior to and during communication sessions. Furthermore, automatic framing the signing area 304 may reduce an amount of signing motions that are lost (e.g., not sent to relay service 106) during a conversation due to the user's hands leaving the field of view 302 of the camera 222. Thus, occasions where users have to repeat themselves because their signing was not transmitted to the call assistant may be reduced. Additionally, automatic framing the signing area 304 may reduce any need for a user to sign in uncomfortable positions in order for the signing to be captured on the camera 222. Rather, the users may sign wherever it is comfortable for the users to sign, and the video endpoint 102 will accommodate such that the signing is captured by the camera 222. Moreover, automatic framing the signing area 304 may allow a user to move about relative to the camera 222 during a conversation. Likewise, automatic framing of the signing area 304 may provide a more seamless transition between users when the users change and the users have different signing areas. In other words, there is no need to change settings on the camera 222 each time the user changes. This may be particularly useful for video endpoints associated with call assistants at the relay service 106, which may change throughout the day.

Furthermore, known automatic framing techniques do not provide the above described advantages to audibly impaired users. Rather, known automatic framing techniques work against audibly impaired users' interests and discourage including regions around users' bodies typically used during signing. Such known automatic framing techniques claim that a user's body typically fills these regions (i.e., regions included in signing areas) and that these regions do not provide useful information.

Figure 3C:
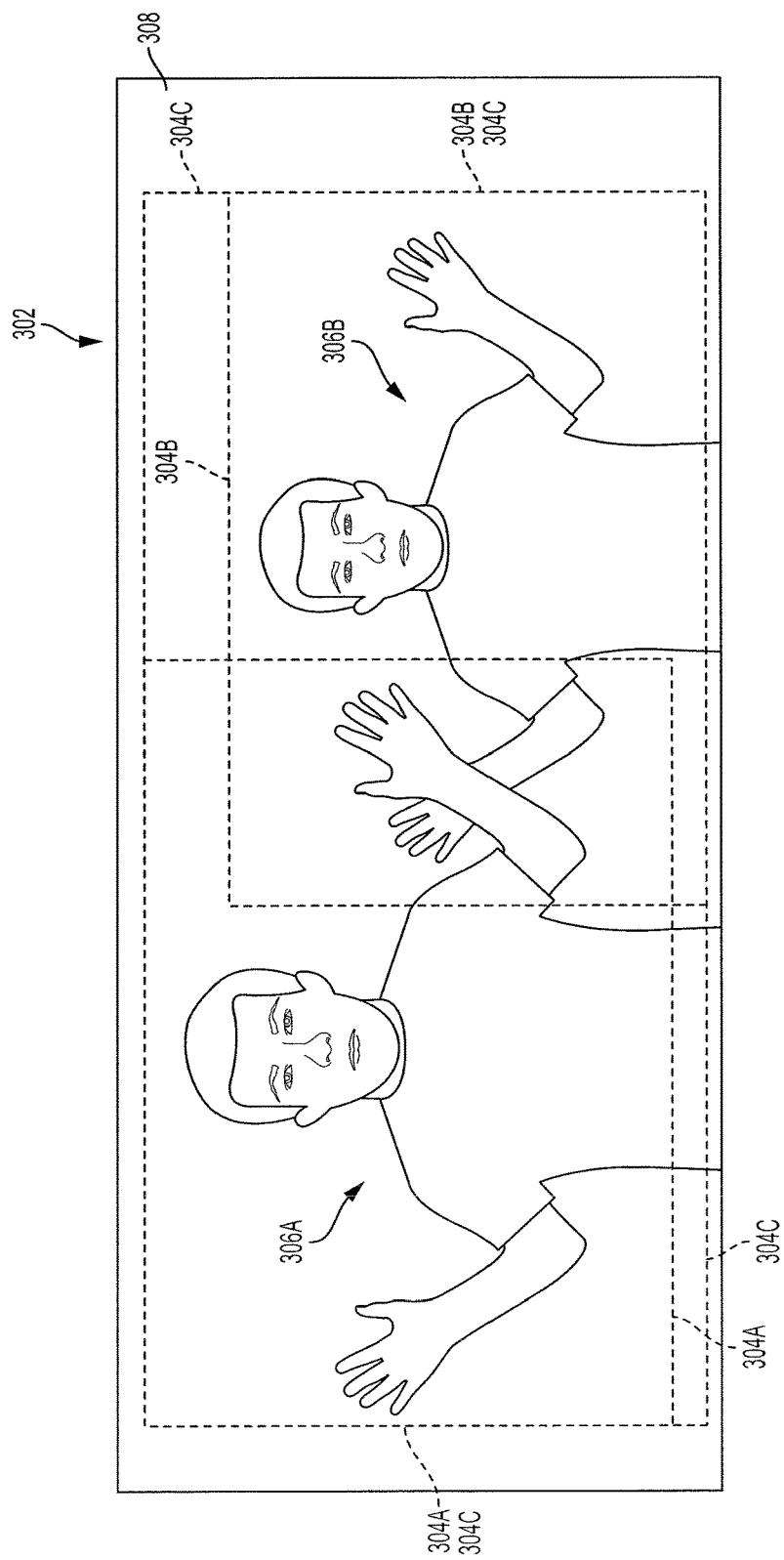

FIG. 3C illustrates a field of view in which multiple users may be within the field of view 302 at the same time. The video endpoint 102 may be configured to recognize the presence of the multiple users 306A, 306B and determine the different individual signing areas 304A, 304B for each user 306A, 306B individually. The video endpoint 102 may also determine a combined signing area 304C from the dimensions and locations of the individual signing areas 304A, 304B. For example, the left boundary of the combined signing area 304C may be the left-most boundary of the individual signing areas 304A, 304B. The right boundary of the combined signing area 304C may be the right-most boundary of the individual signing areas 304A, 304B. The top boundary of the combined signing area 304C may be the top-most boundary of the individual signing areas 304A, 304B. The bottom boundary of the combined signing area 304C may be the bottom-most boundary of the individual signing areas 304A, 304B. As a result, the combined signing area 304C may be the union of the individual signing areas 304A, 304B. The video endpoint 102 may automatically adjust the camera to frame the field of view 302 to include at least the combined signing area 304C. Adjusting the field of view 302 may include centering the field of view 302 based on a central point of the combined signing area 304C. If additional users are detected to enter the field of view, additional individual signing areas may be determined as well as a new combined signing area 304C used to automatically frame the field of view 302. Likewise, if users are detected to leave the field of view 302, a new combined signing area 304C may be determined for the users remaining, or an individual signing area may be used for the automatic framing in the event that only one user is present.

In some embodiments, the video endpoint 102 may provide the audibly-impaired users 306A, 306B with the option to perform auto-framing on a smaller group of individuals within the room. For example, even though both users 306A, 306B are present, it may be desirable for the video endpoint 102 to only perform auto-framing on the first user 306A. Thus, the processor 220 may ignore the presence of the second user 306B while determining the desired signing area. The user interface presented on the video endpoint 102 may enable the user to select the users to track and/or ignore. In some embodiments, the selection may be performed based on the video data (e.g., touching the touch screen to indicate which individuals should or should not be tracked). In some embodiments, the selection may be performed based on selecting individuals (e.g., from a menu) to track and/or ignore. Thus, the processor 220 may recognize the individuals (e.g., through facial recognition) and take the appropriate action (or no action) based on the selection made.

Figure 4:
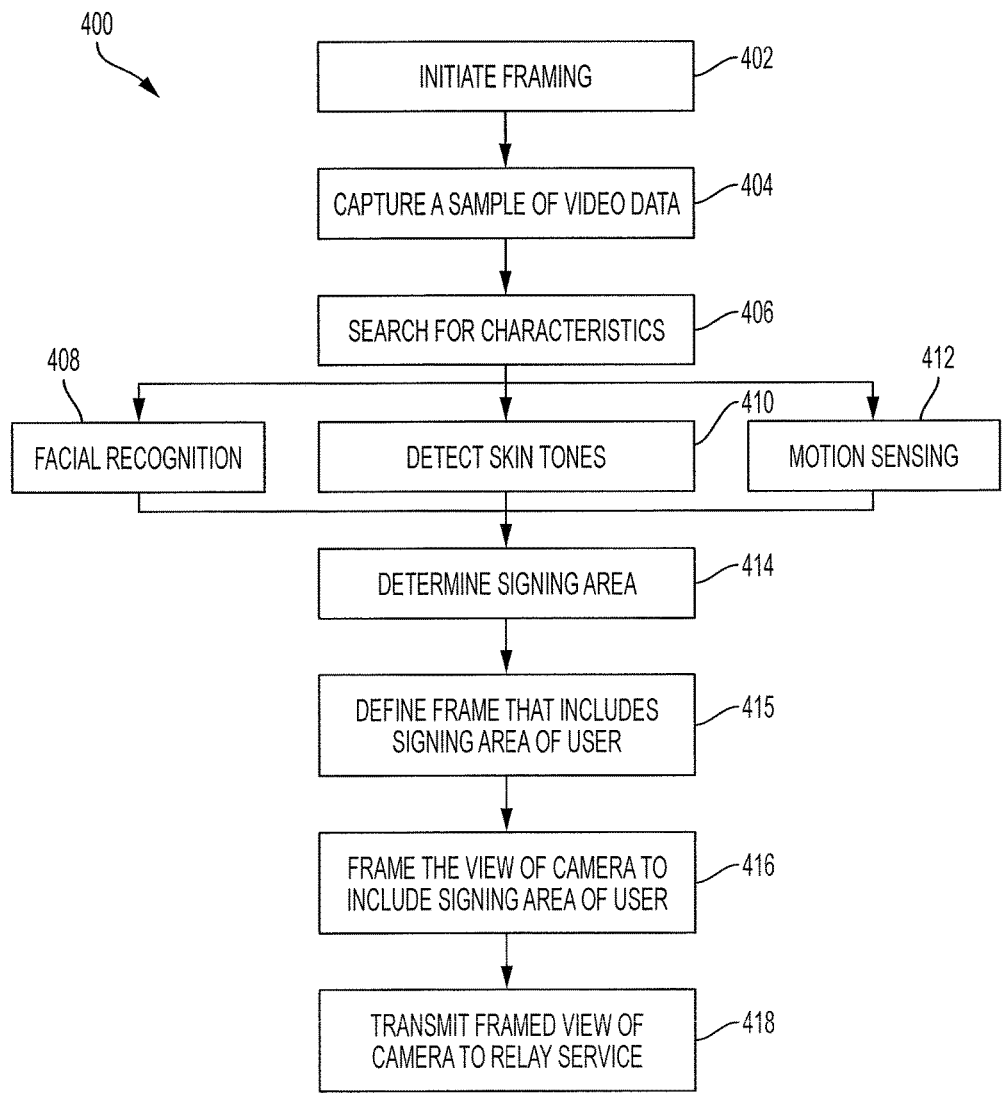
FIG. 4 is a flowchart illustrating a method of operating a communication system.

FIG. 4 shows a flowchart 400 illustrating a method of automatic framing a field of view 302 of the camera 222. Prior to or at the beginning of a communication session with the relay service 106, the video endpoint 102 may initiate framing (block 402) of the field of view 302 of the camera 222 to include a signing area 304 of the user. In some embodiments, a user may initiate framing of the field of view 302 of the camera 222 with a user input (e.g., push a button, voice command, motion, etc.) at the beginning of a communication session. In other embodiments, the video endpoint 102 may have an automatic mode in which the video endpoint 102 be configured to automatically begin framing the field of view 302 of the camera 222 without a user input. For example, the video endpoint 102 may be configured to automatically begin framing the field of view 302 of the camera 222 when the video endpoint 102 is powered on, detects a user in video data 108 captured by the camera 222, initiates a communication session, etc. The dimensions of the signing area 304 may be predefined for a particular user or may be derived based on proportional information for a signing area for a typical user.

When the video endpoint 102 begins to frame the field of view 302 of the camera 222, the video endpoint 102 may capture a sample of video data 108 (block 404). The video endpoint 102 may pan, tilt, and/or zoom the camera 222 prior to or while capturing the sample of video data 108 in order to get a most inclusive field of view 302 of the user and environment 308 around the user. For example, the video endpoint 102 may zoom the camera 222 all the way out to acquire the widest field of view 302 of the camera 222 possible. In other words, the video endpoint 102 may pan, tilt, and/or zoom the camera 222 in order to acquire the most data and to ensure that the sample of video data 108 includes video images showing the user. In some embodiments, the video endpoint 102 may determine (e.g., have been programmed with and/or learned) a setting of the camera 222 (e.g., pan setting, tilt setting, and/or zoom level) that will typically include the user and a sufficient amount of environment 308 in order to perform the automatic framing function described herein. The video endpoint 102 may determine such a setting when, for example, the video endpoint 102 is used in a small room and zooming the camera 222 all the way out would not be necessary and/or helpful in capturing video images of the user and surrounding environment 308. In some embodiments, the video endpoint 102 may simply pan, tilt, or zoom the camera 222 until the video endpoint 102 detects a user in the video data 108.

Once the video endpoint 102 has acquired a sample of video data 108 that includes the user, the video endpoint 102 may search for characteristics of the user (block 406) in order to determine a reference point to determine the appropriate field of view 302 of the camera 222 that includes the signing area 304 of the user. Furthermore, in some embodiments, the video endpoint 102 may search for characteristics of the user (block 406) in order to determine a field of view 302 of the camera 222 that includes the head of the user. As discussed briefly above, the video endpoint 102 may use one or more techniques to locate the reference point to apply a known signing area 304 and/or to determine an unknown signing area 304 in real-time.

In some embodiments, the video endpoint 102 may use facial recognition (block 408) techniques, at least in part, to determine a signing area 304 of a user. The video endpoint 102 may detect faces by detecting regions of the field of view 302 of the camera 222 that are likely to indicate a location of a face in the field of view 302. For example, the video endpoint 102 may detect which regions of the field of view 302 of the camera 222 contain skin tones, and the video endpoint 102 may use facial recognition algorithms to analyze the regions containing skin tones for facial features (e.g., eyes, mouth, nose, etc.). For example, the video endpoint 102 may use facial recognition techniques similar to the facial recognition techniques described in U.S. Pat. No. 8,248,448, to Feng et al., issued Aug. 21, 2012, the disclosure of which is incorporated herein in its entirety by this reference.

In some embodiments, after the video endpoint 102 has recognized a face of the user within the field of view 302 of the camera 222, the video endpoint 102 may take some measurements of the head and/or face of the user. For example, the video endpoint 102 may take a measurement from a top of the head of the user to the bottom of the chin of the user. Such a measurement may be considered one head length. Furthermore, the video endpoint 102 may take a measurement from a first side of the head of the user to a second opposite side of the head of the user. Such a measurement may be considered one head width. Based on the measurements of the head and/or face of the user, the video endpoint 102 may determine a likely signing area 304 of the user relative to the head. For example, the signing area 304 of the user may be based on a proportional distance above the head of the user and may extend a proportional distance below the head of the user, vertically. Furthermore, the signing area 304 may extend proportional distance to each side of the head of the user. Accordingly, the video endpoint 102 may determine a signing area 304 of the user (block 414) based on measurements taken with facial recognition techniques. In some embodiments, the video endpoint 102 may take measurements of not only the head of the user, but may take measurements of one or more of the eyes, nose, ears, shoulders, etc., of the user.

In some embodiments, the video endpoint 102 may use techniques for detecting skin tones (block 410), at least in part, to determine a signing area 304 of a user. The video endpoint 102 may take an average of chrominance (i.e., color information of the video images) of different regions of the field of view 302 of the camera 222. If the average of chrominance of a region of the field of view 302 is within a range associated with skin tones, then that region of the field of view 302 is deemed to have a skin tone characteristic. Several methods are known in the art for finding skin tones within video images. For example, the video endpoint 102 may employ techniques for detecting skin tones similar to the techniques described in U.S. Pat. No. 8,248,448, to Feng et al. However, unlike known automatic framing techniques, the video endpoint 102 may look for multiple regions of the field of view 302 of the camera 222 containing skin tones. For example, instead of only looking for a region of skin tone that may be the head and/or face of the user, the video endpoint 102 may look for additional regions that may be the hands of the user. In some embodiments, the video endpoint 102 may use a combination of facial recognition techniques to locate a head of the user within the field of view 302 of the camera 222, as described above, and skin tone detection techniques to locate the hands of the user within the field of view 302 of the camera 222. Once the video endpoint 102 has detected the head and hands of the user within the field of view 302 of the camera 222, the video endpoint 102 may track the hands of the user in order to determine a signing area 304 of the user. For example, the video endpoint 102 may track the hands of the user for a certain amount of time, and based on where the hands of the user travel within the field of view 302 of the camera 222 during that time, the video endpoint 102 may determine a signing area 304 of the user (block 414).

In some embodiments, the video endpoint 102 may use motion sensing (block 412) techniques, at least in part, to determine a signing area 304 of a user. Furthermore, as the hands of the user will most likely be performing the most motion in a field of view 302 of the camera 222 during a communication session, by detecting the range of motion of the hands of the user, the signing area 304 of the user may be determined (block 414).

In some embodiments, the video endpoint 102 may be configured to recognize a user using facial recognition techniques. Furthermore, once a user's signing area 304 has been determined by the video endpoint 102, the video endpoint 102 may store information related to the signing area 304 of the user such that when the user uses the video endpoint 102 in the future, the video endpoint 102 will recognize the user and retrieve a known signing area 304 of the user. In other words, the video endpoint 102 may store information and dimensions for different users' respective signing areas and may be configured to, upon recognition of a user, use (e.g., frame) the user's respective signing area.

The video endpoint 102 may use any combination of above described techniques to determine a signing area 304 of the user. For example, the video endpoint 102 may use a facial recognition technique to locate the head of a user and a motion sensing technique to determine a signing area 304 of the user. After the signing area 304 of a user has been determined (block 414), the video endpoint 102 may be configured to define a frame of the field of view 302 of the camera 222 that includes the signing area 304 of the user (block 415). In some embodiments, the video endpoint 102 may also be configured to define a frame of the field of view 302 of the camera 222 that includes the signing area 304 of the user and the head of the user (block 415).

After the video endpoint 102 has defined a frame of the field of view 302 of the camera 222 that includes the signing area 304 of the user, the video endpoint 102 may frame the field of view 302 of the camera 222 to include the signing area 304 of the user (block 416). In some embodiments, the video endpoint 102 may frame the field of view 302 of the camera 222 to include the signing area 304 (block 416) and the head of the user. Furthermore, in some embodiments, the video endpoint 102 may frame the field of view 302 of the camera 222 to include the signing area 304 (block 416) while maintaining a natural field of view 302 of the user, as described above. The video endpoint 102 may frame the field of view 302 of the camera 222 by optically and/or digitally framing the field of view 302 of the camera 222. For example, the video endpoint 102 may tilt, pan, and/or optically zoom the camera 222 to include the signing area 304 of a user. Furthermore, the video endpoint 102 may digitally focus on the signing area 304 of the user. In other words, the video endpoint 102 may digitally zoom in on a region of the video images of the video data 108 containing the signing area 304 of the user and/or crop the video images of the video data 108 to remove unimportant regions of the field of view 302 of the camera 222.

In some embodiments, the video endpoint 102 may continuously adjust the field of view 302 of the camera 222. In other words, the video endpoint 102 may constantly be reframing the field of view 302 of the camera 222 to include the signing area 304 of the user. In other embodiments, the video endpoint 102 may reframe the field of view 302 of the camera 222 at intervals (e.g., periods of time). For example, the video endpoint 102 may reframe the field of view 302 of the camera 222 at a desired refresh rate.

After the video endpoint 102 has framed the field of view 302 of the camera 222 to include a signing area 304 of the user, the video endpoint 102 may transmit the framed field of view 302 of the camera 222 to the relay station 106 (block 418) of the communication system 100. In some embodiments, the relay station 106 may also perform an automatic framing function with respect to video data 108 captured at the relay station 106 (e.g., video data 108 of the call assistant signing). Furthermore, in some embodiments, the far-end communication device 104 may also perform an automatic framing function with respect to video data 108 captured at the far-end communication device 104.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A communication system, comprising:
  a video endpoint having a camera, the video endpoint configured to:
    determine dimensions of an initial signing area of an audibly-impaired user during a setup procedure prior to engaging in a communication session by analyzing a range of motion for the audibly-impaired user to sign a predetermined word or set of words, wherein the video endpoint is configured to determine the dimensions of the initial signing area of the audibly-impaired user by taking measurements of at least a portion of the audibly-impaired user's body and automatically framing the camera to include a region including the initial signing area based on the measurements; and
    automatically frame a field of view of the camera to include the initial signing area or a determined adjusted signing area of the audibly-impaired user having updated dimensions based, at least in part, on a range of motion for the audibly-impaired user's signing motions during the communication session; and
  a relay service configured to provide sign language translation services during a communication session with the audibly-impaired user at the video endpoint and a far-end user at a communication device.

2. The communication system of claim 1, wherein the video endpoint is configured to perform facial recognition to identify a reference point for applying or determining the initial signing area of the audibly-impaired user.

3. The communication system of claim 1, wherein the video endpoint is configured to perform motion sensing to determine the range of motion for the audibly-impaired user's signing motions to determine the dimensions of the initial signing area of the audibly-impaired user.

4. The communication system of claim 1, wherein the video endpoint is configured to detect skin tones of the audibly-impaired user to identify a reference point for applying or determining the initial signing area of the audibly-impaired user.

5. The communication system of claim 1, wherein the dimensions of the initial signing area are determined as on a proportional amount horizontally and vertically from the portion of the audibly-impaired user's body based on the measurements.

6. The communication system of claim 1, wherein the video endpoint is configured to initiate framing the field of view of the camera automatically upon an occurrence of one or more of the video endpoint being powered on, the video endpoint detecting the presence of the audibly-impaired user, and the video endpoint establishing a new communication session.

7. The communication system of claim 1, wherein the video endpoint is configured to initiate framing the field of view of the camera upon a user input.

8. The communication system of claim 1, wherein the video endpoint is configured to continuously automatically frame the field of view of the camera throughout a communication session to include the initial signing area for the audibly-impaired user.

9. A video endpoint, comprising:
a camera configured to capture video data for a field of view; and
a processor operably coupled to the camera, wherein the processor is configured to:
determine dimensions of an initial signing area of a user during a setup procedure by analyzing a range of motion for the user to sign a predetermined word or set of words prompted by the setup procedure prior to engaging in a communication session, wherein the initial signing area of the user includes a region extending vertically from above a head of the user to about a navel of the user and extending horizontally beyond shoulders of the user; and
determine the field of view of the camera and adjust the camera to frame the field of view to include the initial signing area determined signing area or an adjusted determined signing area of a user having dimensions based, at least in part, on analyzing a range of motion for the user's signing motions dynamically in real-time during the communication session.

10. The video endpoint of claim 9, wherein the processor is configured to determine the dimensions of the initial signing area and the adjusted signing area of the user dynamically in real-time during a communication session based on proportional measurements taken from a body part of the user.

11. The video endpoint of claim 9, wherein the processor is configured to determine dimensions of a signing area for multiple users within the field of view at the same time and adjust the camera to frame the field of view to include a combined signing area of the multiple users.

12. The video endpoint of claim 9, further comprising memory storing dimensions for a plurality of different defined signing areas for each of a plurality of different known users of the video endpoint, and wherein the processor is configured to apply the corresponding dimensions of the defined signing area stored in memory responsive to identifying a known user.

13. A video endpoint, comprising:
a camera configured to capture video data for a field of view; and
a processor operably coupled to the camera, wherein the processor is configured to:
determine dimensions of an initial signing area of a user during a setup procedure by analyzing a range of motion for the user to sign a predetermined word or set of words prompted by the setup procedure prior to engaging in a communication session; and
determine the field of view of the camera and adjust the camera to frame the field of view to include the initial signing area determined signing area or an adjusted determined signing area of a user having dimensions based, at least in part, on analyzing a range of motion for the user's signing motions dynamically in real-time during the communication session, wherein the processor is configured to determine the dimensions of the initial signing area and the adjusted signing area of the user dynamically in real-time during a communication session based on proportional measurements taken from a body part of the user.

* * * * *